United States Patent
Nader et al.

(10) Patent No.: US 12,101,657 B2
(45) Date of Patent: Sep. 24, 2024

(54) METHODS FOR ACTIVATION/DEACTIVATION OF MEASUREMENT CONFIGURATIONS VIA LINKAGE

(71) Applicant: TELEFONAKTIEBOLAGET LM ERICSSON (PUBL), Stockholm (SE)

(72) Inventors: Ali Nader, Malmö (SE); Oumer Teyeb, Montreal (CA); Mattias Bergström, Sollentuna (SE); Icaro L. J. Da Silva, Solna (SE); Joakim Axmon, Limhamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 381 days.

(21) Appl. No.: 17/607,993

(22) PCT Filed: Apr. 30, 2020

(86) PCT No.: PCT/IB2020/054112
§ 371 (c)(1),
(2) Date: Nov. 1, 2021

(87) PCT Pub. No.: WO2020/222172
PCT Pub. Date: Nov. 5, 2020

(65) Prior Publication Data
US 2022/0353720 A1 Nov. 3, 2022

Related U.S. Application Data

(60) Provisional application No. 62/842,108, filed on May 2, 2019.

(51) Int. Cl.
*H04W 24/10* (2009.01)
*H04L 5/00* (2006.01)
(Continued)

(52) U.S. Cl.
CPC .......... *H04W 24/10* (2013.01); *H04L 5/0053* (2013.01); *H04W 24/08* (2013.01); *H04W 36/0058* (2018.08)

(58) Field of Classification Search
CPC . H04W 24/10; H04W 24/08; H04W 36/0058; H04L 5/0053
(Continued)

(56) References Cited

U.S. PATENT DOCUMENTS 11,140,567 B2 * 10/2021 Tsai ...................... H04W 24/10
11,729,778 B2 * 8/2023 Van Der Velde ..... H04W 76/15
370/329
(Continued)

FOREIGN PATENT DOCUMENTS

EP 3113543 A1 1/2017
WO 2015169391 A1 11/2015

OTHER PUBLICATIONS

VIVO: "UE Power Consumption Reduction in RRM Measurement", 3GPP Draft; R2-1903206 UE Power Consumption Reduction TN RRM Measurement, 3rd Generation Partnership Project (3GPP), Mobile Competence Centre; 650, Route Des Lucioles ; F-06921 Sophia-Antipolis Cedex; Retrieved from the Internet: URL:http://www.3gpp.org/ftp/Meetings%5F3GPP%5FSYNC/RAN2/Docs/R2%2D1903206%2Ezip.
(Continued)

*Primary Examiner* — Mong-Thuy T Tran
(74) *Attorney, Agent, or Firm* — Sage Patent Group

(57) ABSTRACT

A method for performing measurements in a wireless device is provided. The method comprises: storing a plurality of received measurement configurations, which are linked to each other; applying a first measurement configuration from the plurality of measurement of configurations; and determining whether to apply a second measurement configura-
(Continued)

tion from the plurality of measurement configurations based on the first measurement configuration.

15 Claims, 9 Drawing Sheets

(51) Int. Cl.
  *H04W 24/08* (2009.01)
  *H04W 36/00* (2009.01)
(58) Field of Classification Search
  USPC .......................................................... 370/329
  See application file for complete search history.

(56) References Cited

U.S. PATENT DOCUMENTS

| | | | | |
|---|---|---|---|---|
| 2013/0077513 | A1* | 3/2013 | Ng | H04L 1/0026 370/254 |
| 2013/0260741 | A1* | 10/2013 | Yamada | H04L 1/0026 455/422.1 |
| 2014/0036707 | A1 | 2/2014 | Kitazoe et al. | |
| 2014/0087715 | A1* | 3/2014 | Suzuki | H04W 24/10 455/422.1 |
| 2014/0357197 | A1* | 12/2014 | Jung | H04W 24/10 455/67.11 |
| 2015/0092578 | A1* | 4/2015 | Ingale | H04W 24/10 370/252 |
| 2015/0139005 | A1* | 5/2015 | Tsuboi | H04W 72/21 370/252 |
| 2015/0195731 | A1* | 7/2015 | Jung | H04L 5/0094 370/252 |
| 2015/0327097 | A1* | 11/2015 | Chai | H04W 24/08 370/252 |
| 2015/0334767 | A1* | 11/2015 | Chien | H04W 72/23 370/217 |
| 2016/0029265 | A1* | 1/2016 | Li | H04W 36/30 455/436 |
| 2019/0357069 | A1* | 11/2019 | Harada | H04W 72/04 |
| 2020/0029262 | A1* | 1/2020 | Kim | H04W 74/0833 |
| 2020/0154326 | A1* | 5/2020 | Deenoo | H04W 74/0833 |
| 2020/0267586 | A1* | 8/2020 | Hwang | H04W 48/16 |
| 2022/0038976 | A1* | 2/2022 | Hwang | H04W 36/0072 |

OTHER PUBLICATIONS

Zembery, Peter, "International Search Report" PCT/IB2020/054112; EPO, The Netherlands, Jul. 30, 2020.

* cited by examiner

METHODS FOR ACTIVATION/DEACTIVATION OF MEASUREMENT CONFIGURATIONS VIA LINKAGE

RELATED APPLICATIONS

The application claims the benefits of priority of U.S. Provisional Patent Application No. 62/842,108, entitled "Activation/deactivation of measurement configuration via linkage" and filed at the United States Patent and Trademark Office on May 2, 2019, the content of which is incorporated herein by reference.

TECHNICAL FIELD

The present description generally relates to wireless communication systems and more specifically to providing multiple sets of measurements and/or configurations that are linked together so that the measurements can lock and unlock each other.

BACKGROUND

New radio (NR) standard in Third Generation Partnership Project (3GPP) is being designed to provide service for multiple use cases such as enhanced mobile broadband (eMBB), ultra-reliable and low latency communication (URLLC), and machine type communication (MTC). Each of these services has different technical requirements. For example, the requirement for eMBB is high data rate with moderate latency and moderate coverage, while URLLC service requires a low latency and high reliability transmission but perhaps for moderate data rates.

For the sake of mobility both within NR, and in-between NR and other radio access technology (RAT), such as Long Term Evolution (LTE), mobility related functionality is defined in the 3GPP standards and implemented in the network (NW) and the user equipment (UE). Such functionality can be divided into UE-controlled mobility which is relevant in RRC_IDLE/RRC_INACTIVE states (as defined in 3GPP TR 38.304/38.331) and NW-controlled mobility which is relevant in RRC_CONNECTED state (as defined in 3GPP TR 38.331). The present disclosure addresses the latter case in which a UE is configured by the NW to carry out measurements. For example, the configurations provided by the NW to the UE result into thresholds that control triggering of various events in the UE. Based on these NW-configured measurement events, the UE triggers measurement reports to the NW, thereby assisting the NW to decide which network node the UE should be connected to.

The measurement configuration includes the following parameters:

1. Measurement objects (MOs): A list of objects on which the UE shall perform the measurements.

For intra-frequency and inter-frequency measurements, a measurement object indicates the frequency/time location and subcarrier spacing of reference signals to be measured.

Associated with this measurement object, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

Each MO is identified by an identifier, such as measObjectId; the measObjectId of the MO which corresponds to each serving cell is indicated by servingCellMO within the serving cell configuration.

For inter-RAT Evolved Universal Terrestrial Radio Access (E-UTRA) measurements, a measurement object is a single E-UTRA carrier frequency. Associated with this E-UTRA carrier frequency, the network can configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

2. Reporting configurations: A list of reporting configurations is provided where there can be one or multiple reporting configurations per measurement object. Each reporting configuration consists of the following:

Reporting criterion: The criterion that triggers the UE to send a measurement report. This can either be periodical or a single event description.

Reference Signal (RS) type: The RS that the UE uses for beam and cell measurement results (Synchronization Signal (SS)/Physical Broadcast Channel (PBCH) block or Channel State Information (CSI)-RS).

Reporting format: The quantities per cell and per beam that the UE includes in the measurement report (e.g. Reference Signal Received Power (RSRP)) and associated information, e.g. the maximum number of cells and the maximum number of beams per cell to report.

3. Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

4. Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

5. Measurement gaps: Periods that the UE may use to perform measurements.

The reporting configuration can be periodical or event triggered. If it is periodical, the reporting will be done at the specified reporting intervals regardless of the measurement results, while event triggered ones are reported only when specific triggering conditions are met.

The set of events defined in Release15 TR 38.331 are outlined below:

Event A1: a Serving cell becomes better than a threshold (in terms of reference signals);
Event A2: a Serving cell becomes worse than a threshold;
Event A3: a Neighbour cell becomes better by an offset than a special cell (SpCell);
Event A4: a Neighbour cell becomes better than a threshold;

Event A5: SpCell becomes worse than a first threshold and a neighbour cell becomes better than a second threshold (threshold2);

Event A6: a Neighbour cell becomes better by an offset than a SCell;

Event B1: an Inter RAT neighbour cell becomes better than a threshold;

Event B2: a PCell becomes worse than threshold1 and an inter RAT neighbour becomes better than threshold2;

where the Ax events (with x=1 to 6) are relevant for NR cells, whereas the Bx events (with x=1 to 2) are relevant for LTE cells. It shall be noted that multiple events may be configured and evaluated in parallel in the UE. Multiple reporting configurations can be associated with one measurement object or vice versa.

It is up to the NW implementation to decide which type of events the network configures in the UE. It is however seen as a common praxis to not over-configure the UE unnecessarily as this would be too resource and power consuming for the UE and might result in unnecessary reports over the air, consuming NW resources. For example, it might not be suitable to always have a Bx event configured in the UE, as this would imply that the UE would need to constantly measure on LTE carriers, even when the UE is camped on a good quality NR cell.

Therefore, in most NW implementations, a step-wise approach is chosen in which measurement configurations are provided to the UE when necessary, as depicted in FIG. 1. FIG. 1 illustrates a generic high-level exemplary inter-frequency/RAT mobility handover scenario including a step-wise configuration of mobility-related events, reporting and handover.

For example, in an area with poor NR coverage and good LTE coverage, a UE camped on an NR cell might have been configured with an A2 event mentioned above (step 110, where event X refers to event A1). The UE constantly measures the serving cell and once the UE experiences poor coverage (i.e. when the serving cell drops below the configured threshold), the event (e.g. Event X) is triggered, and the UE sends a measurement report to the NW (120). First, the NW provides an event B1 (or B2) configuration to the UE (step 130, where event Y refers to even B1/B2), so that the UE starts measuring on relevant LTE carriers and evaluating the new event. In case a B1 event is triggered and a report is sent to the NW (step 140), the UE is commanded to perform a handover to the LTE cell that triggered the B1 event (150).

SUMMARY

Currently there exists some challenges. There is a trade-off between a conservative/cautious configuration of the event-related parameters (e.g. thresholds, time-to-trigger, hysteresis, gaps, and other parameters found in TR 38.331) and the power consumption in the UE. Configuring parameters conservatively, i.e. making sure that the UE triggers and reports early when there is still a good link available, gives the NW a good chance to take proper action towards the UE, e.g. configure the next event (i.e. Link vs Battery). Having a good link towards the UE is of high priority in order not to lose the UE and avoid bad user experience. Thus, it is natural to configure these events conservatively. However, this also comes at the cost of extra energy consumption, since measurements can be carried out prematurely and potentially completely unnecessary (including unnecessary signaling). For example, this is the case when an event that triggered the next configuration step is not relevant any longer (e.g. serving cell becomes good again).

Also, as excessive triggering of reports from each UE and reconfigurations from the NW is not desired over the scarce air interface, the configurations are kept on a coarse level. As such, the framework becomes too rigid. For example, in the case of intra-NR mobility, in theory it would be possible to (re-)setup/(re-)configure events such as A2 and A3 multiple times with different parameters each time, e.g. different thresholds and different measurement object SMTC window. Indeed, the SMTC window can be made wider and wider and the threshold lower and lower. This would mean, as the UE is moving to poorer coverage, that the search window in the UE for other neighbors is made wider. But, in practice, the massive amount of reporting and reconfigurations resulting from this approach for each UE would make the system impossible to run.

Furthermore, each (re-)configuration step over the air interface is a power consuming task for the UE. First, reception and transmission are a power consuming task for the UE. Secondly, each time the UE, in Connected Discontinuous Reception (C-DRX), receives a configuration or transmits a message, e.g. configuration handshaking or a measurement report, the UE has to leave the DRX-OFF period and stay out of it for a certain time (see inactivity-timer in TR 38.321).

These two existing solutions are illustrated in FIGS. 2 and 3. FIG. 2 illustrates the first existing solution, which relies on reports followed by re-configurations. For example, the UE is configured to first report measurements to the network node and then is re-configured by the network node to perform additional measurements. The UE's battery consumption is high due to the amounts of reports transmitted. There may also be significant signaling.

FIG. 3 illustrates the second existing solution, which relies on configuring the UE in advance to start performing multiple measurements even though the network (or network node) would not take any actions unless multiple conditions and measurements are received. More specifically, the UE is configured with multiple measurements. Some of these measurements are performed and reported unnecessarily since the network node does not expect to take any action (unless other conditions are fulfilled and other measurements are also received). This leads to increased UE battery consumption.

Hence, there is a need to derive methods that can further optimize UE power consumption without creating excessive amount of delay, and traffic over the air.

Some embodiments allow to overcome or mitigate the challenges as described above. For example, there are provided methods for a network node to provide multiple sets of measurement/reporting configurations to the UE, where the configurations are linked together and can both lock and unlock each other. The UE monitors/evaluates the configured unlocked reporting configurations. When the conditions for the reporting from the configuration are fulfilled, the UE unlocks other dependent configurations.

Through NW configuration, each reporting configuration can also be configured to trigger or not trigger the sending of measurement reports towards the NW.

The embodiments provide efficient mechanisms for the NW to help the UE to achieve power savings and reduce traffic over the air without sacrificing NW performance. The embodiments include a method performed by a wireless device for performing measurements and reporting, and a wireless device configured, or operable, to perform one or more functionalities (e.g. actions, operations, steps, etc.) as described herein.

In some embodiments, the wireless device may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the wireless device may comprise one or more functional modules configured to perform one or more functionalities as described herein.

The embodiments also, there is provided a method performed by a network node for indicating measurements and reporting to a wireless device.

Some embodiments include a network node configured, or operable, to perform one or more functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node or the wireless device, configure the processing circuitry to perform one or more functionalities as described herein. The advantages/technical benefits of the embodiments are as follows: creating a framework that enables: 1) UE power savings (UE avoids unnecessary measurements, less Receive/Transmit (Rx/Tx) transmissions, longer time in DRX-OFF mode of C-DRX; 2) reduced signaling over the air; 3) reduced processing in the NW; 4) reduced latency in mobility (as a result of multiple configurations prepared/configured in the UE, but only relevant measurements being carried out).

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

The disclosure describes methods at the UE or wireless device for performing/reporting measurements based on multiple measurement configurations that are linked to each other. The meaning of being linked is that one measurement configuration refers to a measurement and a triggering condition that, upon being fulfilled, leads the UE to start or to activate/deactivate another measurement configuration. Hence, upon receiving a first measurement configuration, the UE starts to perform measurement accordingly and to verify the fulfillment of a triggering condition. Upon the fulfillment of the triggering condition in the first measurement configuration, the UE activates a second measurement configuration. The dependency/link of the measurements can be temporal and/or frequential. For example, a first measurement that fulfills a condition can trigger a second measurement within a certain time period or frequency.

The methods aim to reduce UE battery consumption by reducing the amount of unnecessary measurements to be performed (e.g. by only activating them when needed, based on conditions decided by the network) and/or the amount of signaling exchanged between the UE and the network (which also reduces the signaling load over the air interface).

Figure 1:
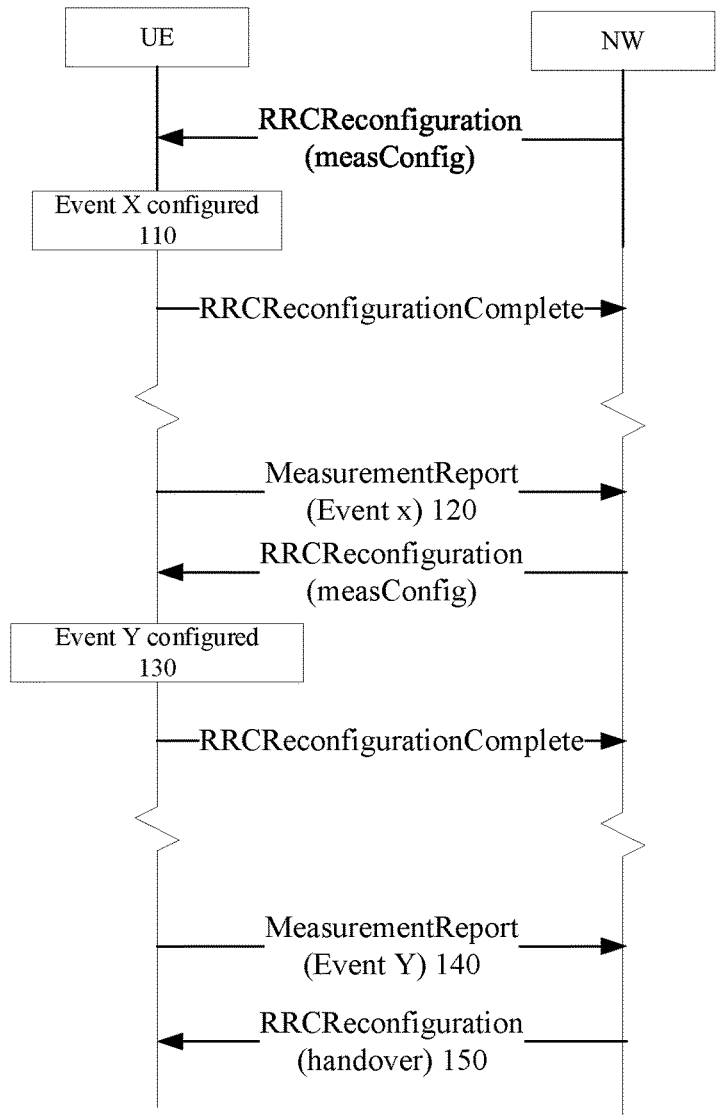
FIG. 1 illustrates a schematic signalling diagram for a handover scenario including a step-wise configuration of mobility related events, reporting and handover.
Figure 2:
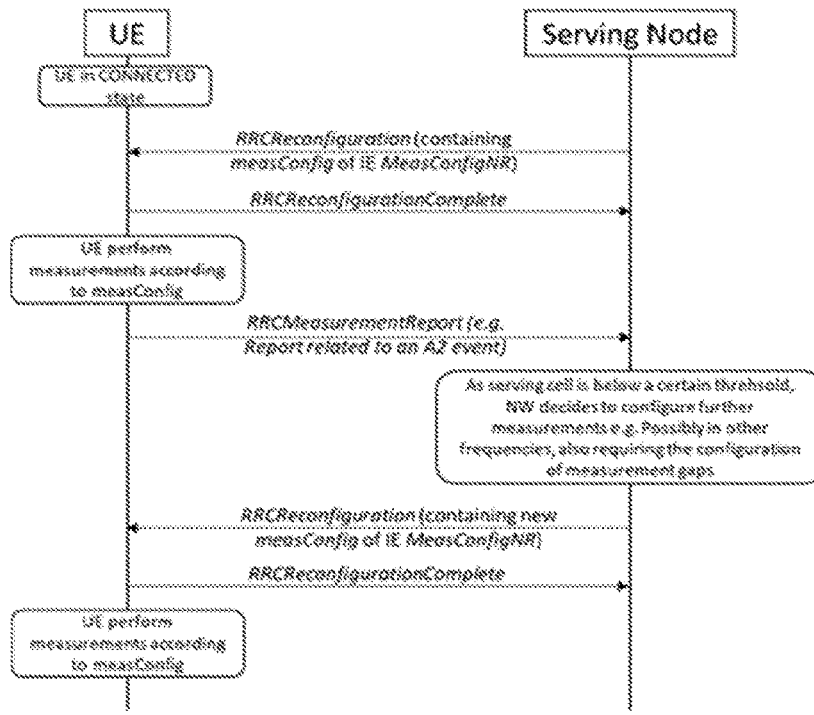
FIG. 2 illustrates a solution for performing measurements, which relies on reports followed by re-configurations.
Figure 3:
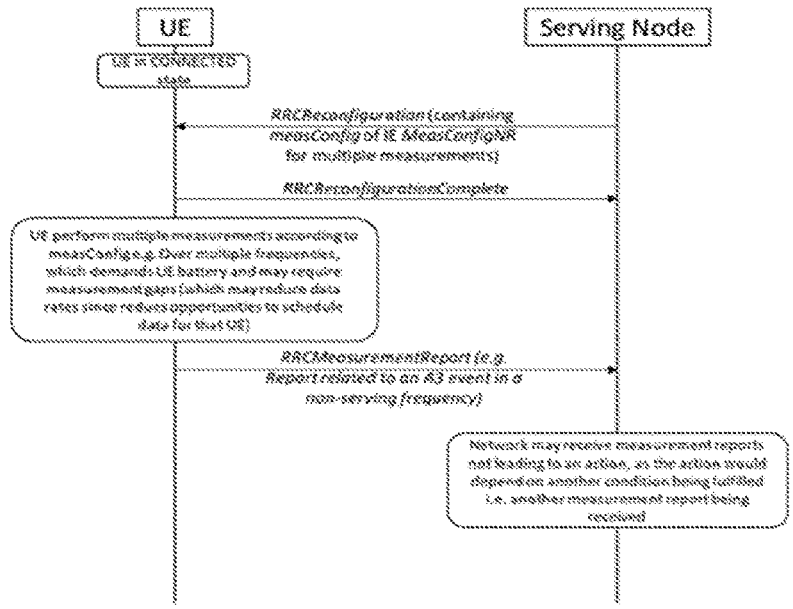
FIG. 3 illustrates a solution for performing measurements, which relies on configuring in advance to start performing multiple measurements.
Figure 4:
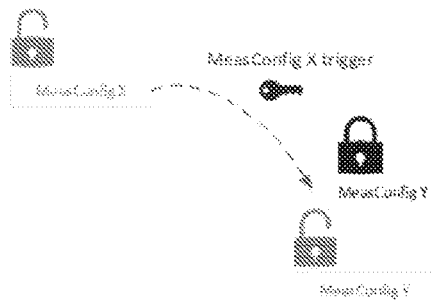
FIG. 4 illustrates two linked configurations, according to some embodiments.

The disclosure also describes methods for the NW (or network node) to provide multiple sets of measurement/reporting configurations to the UE, where the configurations are linked together. The configurations can be provided to the UE in a locked (i.e. deactivated) or unlocked (i.e. activated and to be evaluated by the UE) state. The UE initially treats (performs measurements and evaluates) the unlocked configurations. When the triggering conditions are fulfilled for the unlocked measurement configuration (e.g. when a reporting configuration like an Ax event is fulfilled, x=1, . . . , 6), instead of sending a measurement report or in addition to sending a measurement report, the UE unlocks/enables other dependent measurement configurations that are associated with the configuration that just had its triggering conditions fulfilled. In other words, the UE starts performing the associated measurement and evaluates if the triggering conditions are fulfilled; this is illustrated in FIG. 4 for example. FIG. 4 depicts 2 linked/associated measurement configurations: MeasConfigX (unlocked) linked to MeasConfigY (locked). When the conditions for events configured in MeasConfigX are triggered, MeasConfigY is unlocked and the ULE starts evaluating it. MeasConfig Y becomes locked again when the conditions are not fulfilled anymore. It should be noted that these two configurations can be:

Two separate measConfig IEs that contain a set of measurement objects, reporting configurations, associated with the measurement objects and reporting configs via measIDs, etc.;

x and y could be sub-elements within the same measConfig IE (e.g. two measIDs), where the association between them is also included in the same measConfig.

It should be also noted that more than 2 measurement configurations can be defined. As such, there can be several separate measConfig IEs or several sub-elements.

Through NW configuration, each measurement configuration can also be configured to trigger or not trigger the sending of reporting towards the NW, when the triggering conditions are fulfilled. That is, when the triggering conditions are fulfilled, the reporting configuration can result in triggering of a report (as in legacy), the unlocking/locking of the related configuration, or both.

Figure 5:
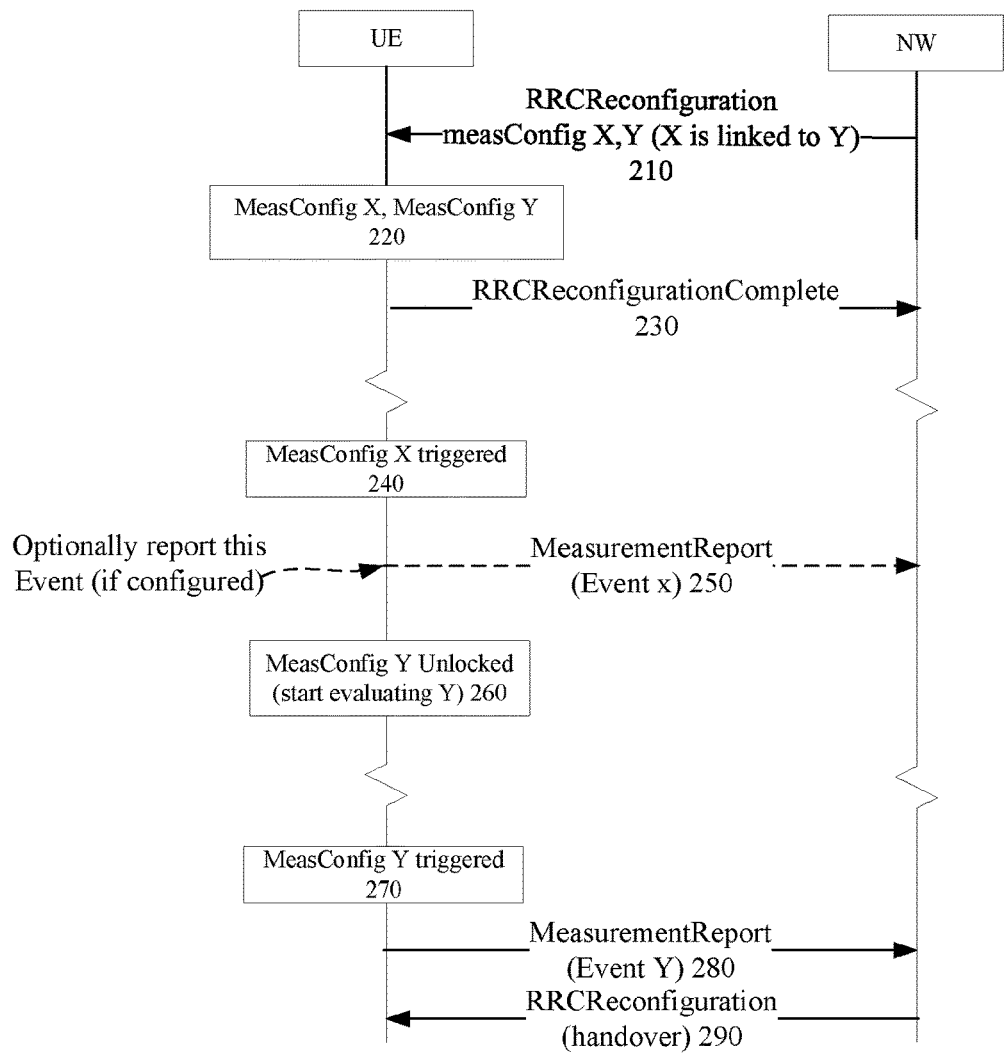
FIG. 5 illustrates a schematic signalling diagram for a handover scenario including linked configurations, according to some embodiments.

As a result, lots of dynamics are enabled by this solution with minimum amount of signaling between the NW and the UE as can be seen in FIG. 5. FIG. 5 depicts a generic high-level exemplary inter-frequency/RAT mobility handover scenario including linked configurations.

The event configurations can be much more granular than the existing methods; different measurement configurations can be set up with small differences in information elements e.g. MeasObjects could be configured in different measurements configurations even for the very same carrier, e.g. different SSBsToMeasure in different events, different SMTC window sizes, whitelists, CSI-RS vs. SSB, etc.

Through such fine granular events and limited amount of signaling over the air interface, it becomes possible to tune the events more efficiently without being afraid of losing the link to the UE as in the existing solutions.

As described above, the term unlocked could mean that a measurement configuration is activated, i.e. the UE receives and stores a measConfig (e.g. of type MeasConfig, comprising reporting configurations, measurement identifiers, measurement objects, measurement gap configurations, etc.) that is applied upon reception of the message carrying that measConfig. Upon applying the measurement configuration, the UE performs measurements according to it.

As described above, the term locked could mean that a measurement configuration is deactivated, i.e. the UE has a stored measConfig (e.g. of type MeasConfig, comprising reporting configurations, measurement identifiers, measurement objects, measurement gap configurations, etc.) that is not applied upon the reception on the message carrying it. That stored measConfig is only applied when the UE fulfills certain conditions.

Back to FIG. 5, in step 210, the NW sends two measurement configurations, MeasConfig X and MeasConfig Y, which are linked to each other, to the UE, in a reconfiguration message. MeasConfig X and MeasConfig Y are associated with event X and event Y, respectively.

In step 220, after receiving the 2 measurements configurations, the UE stores them.

Step 230, the UE replies to the NW with an acknowledgement for the receipt of the 2 measurement configurations.

In step 240, the UE starts performing measurements in accordance with the measurement configuration MeasConfigX. The measurement could be triggered by an event.

In step 250, if the UE is configured to report this event, the UE will send a measurement report based on event X to the NW. This step is optional.

In step 260, the measurements based on MeasConfig X trigger or unlocks the measurement configuration MeasConfig Y. For example, the measurements based on MeasConfig X fulfill some conditions (e.g. thresholds) that trigger MeasConfig Y.

In step 280, the UE sends a report of measurements based on event Y, to the NW.

In step 290, based on the received measurements of event Y, the NW may decide to do a handover. As such, the NW send an indication of handover to the UE.

The methods described above can be implemented as follows:
1. Using associations between reporting configurations;
2. Using associations between measurement configuration;
3. Relying on a conditional reconfiguration framework where the UE applies a stored measurement configuration upon the fulfillment of a trigger condition (which may also be based on a measurement configuration).

Examples below are given in the context of NR RRM measurement configurations, for example, for a UE in RRC_CONNECTED state (e.g. at least one measConfig of IE type MeasConfig, like MeasConfigNR provided in a message like an RRCReconfiguration, RRCResume, RRCConnectionReconfiguration, RRCConnectionResume, etc.).

Assuming the 3GPP framework, the content of a measurement configuration (locked or unlocked) is any configuration provided to the UE that indicates what/how needs to be measured/reported. The exact configuration of each measurement configuration may be, for example, any existing content of the MeasConfig Information Element (IE), currently provided in an RRCResume or RRCReconfiguration message in NR (see 3GPP TS 38.133).

When the examples describe a relation between a triggering condition (based on a first measurement configuration) and a second measurement configuration, the second measurement configuration that becomes unlocked by the fulfillment of the first condition may be interpreted as an instance of the IE MeasConfig., for example. In other words, the fulfillment of the condition may unlock any or multiple of these:

Addition, removal or modification of a measurement object(s);

Addition, removal or modification of reporting configuration(s);

Addition, removal or modification of a measurement identifier that links a measurement object to a reporting configuration, e.g. the UE may associate an existing measurement object to an existing report configuration by a new measurement identifier;

Add a measurement gap related configuration (e.g. measGapConfig and measGapSharingConfig);

Add, remove or modify filtering related configuration (e.g. quantityConfig);

Add, remove or modify s-Measure configuration (i.e. the UE only starts to perform measurements when SpCell quality is below the threshold).

The UE can be configured by the NW with all periodical and/or event-based reporting configurations the NW is interested in (e.g. Ax or Bx events or different instances of these events with different trigger quantities, RS types, with or without beam reporting, etc.). The UE also receives, in the configuration, from the NW, links/associations/dependencies between these configurations. Upon receipt of the linked configurations, the UE starts measuring, evaluating, and when/if the conditions for the configurations are fulfilled, reporting according to a new/dependent unlocked/activated configuration(s), in addition to the ongoing measurements/evaluations (and/or unlocking/activating further dependent configurations), as described above.

Figure 6:
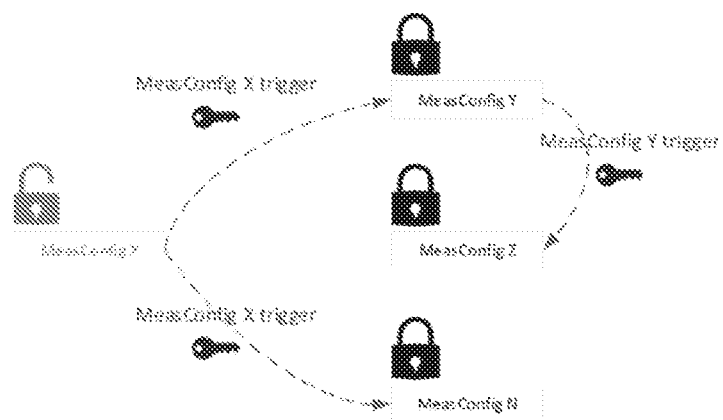
FIG. 6 illustrates multiple sets of configurations in a UE, with linkage in-between, according to some embodiments.

It shall be noted that one configuration may be linked to multiple configurations as depicted in FIG. 6. Furthermore, the linked configurations may or may not be of the same type. For example, the configurations may both be event-based and have the same event type (e.g. both be A2 or both be B1) but with different sub-parameters configured inside any of the Reporting configurations, Measurement Objects configuration, Quantity configuration, Gap configuration, Reference signal timing configuration, Filtering configuration or alike. Equally, the linked configurations could be of different types. For example, an unlocked running configuration may be event-based whereas the linked locked configuration indicates periodical reporting.

Figure 7:
FIG. 7 illustrates two configurations linked together in a mutually exclusive manner, according to some embodiments.

Furthermore, it shall be possible to (re-)lock an unlocked configuration in the UE. This can be done based on an explicit command from the NW or autonomously within the UE based on configurations. For the latter case, some examples of (re-)locking the configurations are described below, with reference to FIG. 6, which illustrates a plurality/chain of measurement configurations that are linked to each other:

an unlocked configuration (e.g. MeasConfigX of FIG. 6) can trigger and unlock the linked configurations (N and Y of FIG. 6). However, the UE keeps monitoring the original "parent" configuration and if the conditions are not fulfilled anymore, the "children" linked configurations are re-locked. Note that the whole chain of unlocked "children" configurations is re-locked in this case (including a potentially unlocked Z of FIG. 6);

two linked configurations can be configured to be mutually exclusive; i.e. an unlocked configuration that triggers and unlocks another configuration locks itself. For example, Y of FIG. 6 would become locked itself in case it triggers and unlocks Z. This configuration (Y) may be unlocked again if the conditions of Z are not fulfilled anymore; whereby Z would become locked again and only Y active. This means that Y and Z are linked together. This is depicted in FIG. 7, which illustrates configurations linked together in a mutually exclusive manner.

It is possible that a first measurement/configuration could trigger the deletion of configurations (via configuration, e.g. deleteUponUnlockingOfOtherCfgs). For example, if one configuration triggers another one, the NW might want the original configuration to be deleted.

New configuration parameter(s) can be introduced to control whether generation of reports towards the NW is necessary. This is visualized in FIG. 5, where reporting of event X towards the NW is optional and reporting of event Y is necessary. Such a configuration could be, for example, provided via the existing IE reportAmount in 3GPP, where the value 0 could be introduced for optional reporting. The UE reports to the NW when it locks/unlocks various configurations.

In legacy LTE or in NR, a measurement configuration (measConfig) includes the association of the measurement objects (what needs to be measured, e.g. frequency, cell, measurement quantity, etc.) and reporting configuration (what needs to be fulfilled to trigger reporting). This is done via measurement IDs. In one example realization, the different measIDs are linked to each other as shown below, where the changes from legacy are underlined:

```
MeasConfig ::=                    SEQUENCE {
   ....
   }                                                          OPTIONAL,  -- Need M
   quantityConfig                 QuantityConfig              OPTIONAL,  -- Need M
   measGapConfig                  MeasGapConfig               OPTIONAL,  -- Need M
   measGapSharingConfig           MeasGapSharingConfig        OPTIONAL,  -- Need M
   ...,
   measIdAssociationToAddModList  MeasIdAssociationToAddModList OPTIONAL,  -- Need N
   measIdAssociationToRemoveList  MeasIdAssociationToRemoveList OPTIONAL,  -- Need N
}
MeasIdConfigAssociationToRemoveList ::= SEQUENCE (SIZE (1..maxReportConfig) OF MeasId
MeasIdAssociationToAddModList ::= SEQUENCE (SIZE (1..maxReportConfig) OF
MeasIdAssociationToAddMod
MeasIdToAddMod ::=           SEQUENCE {
   measId                    MeasId,
   dependentMeasIds          SEQUENCE (SIZE (1..maxMeasId)) OF MeasId    OPTIONAL,
   initialState    ENUMERATED {enabled, disabled},
   reportMeasurements                 BOOLEAN,
   ...
}
```

The MeasIdAssociationToAddMod IE specifies the relation between the measIds. For example, measurement (meas) ID 1 is configured to be enabled and meas IDs 2 and 3 are configured to be dependent on meas ID 1 and disabled initially. Upon the fulfilment of the triggering conditions of the reporting configuration associated with meas ID 1, meas IDs 2 and 3 are enabled. This can be done by a configuration like below:

```
MeasIdAssociationToAddMod ::=         SEQUENCE {
    measId = 1,
    dependentMeasIds = {2,3},
    initialState = enabled,
    reportMeasurements = TRUE,
    }
}
```

Note that reportMeasurements has been set to TRUE, which means that, in addition to activating meas IDs 2 and 3, the fulfilment of the triggering conditions of the reporting configuration associated with meas ID 1 will also trigger the sending of measurement reports. If the sending of measurement reports is not required, then this field can be set to FALSE.

In the above example, if meas IDs 2 and 3 are associated with measurement objects that are different from the measurement objects associated with meas ID 1, then the UE, upon the fulfilment of the triggering conditions of the measurement configuration associated with meas ID 1, will start performing measurements according to the measurement objects associated with meas ID 2 and 3. Also, the UE will start evaluating the triggering conditions for the reporting conditions associated with meas IDs 2 and 3. However, if meas IDs 2 and 3 are also associated with the same measurement objects as meas ID 1, then the UE is already performing the measurements. As such, the only behaviour that is affected is the evaluation of the triggering conditions for the reporting conditions associated with meas ID 2 and 3.

It should be noted that the above is an example realization and there are several possibilities to achieve the methods as described herein. For example, instead of including the MeasIdAssociation IEs/fields, the measIDToAddMod IE can be modified to be as follows:

```
MeasIdToAddMod-r16 ::=              SEQUENCE {
    measId                          MeasId,
    measObjectId                    MeasObjectId,
    reportConfigId                  ReportConfigId,
    dependentMeasIds                SEQUENCE (SIZE (1..maxMeasId)) OF MeasId   OPTIONAL,
    initialState                    ENUMERATED [enabled, disabled],
    reportMeasurements              BOOLEAN
}
```

Additional IEs could also be included for more control of the association between measurement IDs. For the example shown above, let's assume that the conditions for triggering the reporting configuration associated with meas ID 1 get fulfilled and meas IDs 2 and 3 get activated. If the conditions for report configurations associated with meas ID 2 get fulfilled, it is good to check if the conditions for the reporting configurations associated with meas ID 1 are still valid before performing the actions associated with the fulfilment of the conditions for the reporting conditions associated with meas ID 2. This can be a specified behaviour, i.e. RRC specification mandates that when a dependent meas ID's has the triggering conditions of the report configuration fulfilled, the triggering conditions of the report configuration of the parent meas ID has to be re-checked. Action will be taken only if the conditions are still valid. Alternatively, an IE can be introduced in the meas ID association configuration that specifies whether the conditions should be checked or not, as shown below, where the triggerBindingOnDependent field can be used to explicitly indicate that.

```
MeasIdsAssociationToAddMod ::=      SEQUENCE {
    measId                          MeasId,
    dependentMeasId                 SEQUENCE (SIZE (1..maxReportConfigId)) OF MeasId   OPTIONAL,
    initialState   ENUMERATED [enabled, disabled],
    reportMeasurements              BOOLEAN,
    triggerBindingOnDependents      BOOLEAN
    ...
}
```

Or, a modified measIdToAddMod-r16 IE can be used:

```
MeasIdToAddMod-r16 ::=              SEQUENCE {
    measId                          MeasId,
    measObjectId                    MeasObjectId,
    reportConfigId                  ReportConfigId,
```

```
    dependentMeasIds           SEQUENCE (SIZE (1..maxMeasId)) OF MeasId   OPTIONAL,
    initialState               ENUMERATED [enabled, disabled],
    reportMeasurements         BOOLEAN,
    triggerBindingOnDependents BOOLEAN
}
```

In the legacy behaviour, when a measurement gap is configured, it is active all the time (i.e. the UE applies the gaps according to the gap configurations, where during the "gap on" periods, some Transmit/Receive (Tx/Rx) transmissions may be interrupted, depending if the gap is per UE or per FR). The present disclosure also proposes conditional measurement gap configurations. For the above example, with meas ID 1 and its dependent meas IDs 2 and 3, it is possible that the measObjects associated with IDs 2 and 3 measure frequencies/RATs that require measurement gaps, while no gap is required (or a different gap is required) for meas ID 1. To indicate this situation, an association between the measurement gaps and different measurement IDs can be generated. As a note, it could be mandatory to notify the network about the activation/deactivation of a certain measID (or its associated measurement gap). This is because the network needs to know the current measurement gap the UE is using as the network will not be able to schedule the UE on the ON periods of the measurement gap, on some frequency/RATs.

For example, the measurement gaps can be configured as follows:

Furthermore, a feature called conditional handover (CHO) is being standardized in Rel-16 aiming to solve the problem of mobility robustness.

A UE configured with a set of conditional RRCReconfiguration(s), shall execute a handover (or conditional handover) when the condition for the handover is fulfilled. In the context of this disclosure, the term "conditional handover related configuration(s)" may be for a cell, list of cell(s), measurement object(s) or frequencies. In the case of cell association, they may be for the same RAT or for a different RAT.

It is possible to extend the CHO framework so that the network can replace the HO command (RRCReconfiguration with a ReconfigurationWithSync) within the CHO configuration by a measurement configuration, possibly within an RRCReconfiguration (or any other message) without a ReconfigurationWithSync, e.g. containing a measConfig IE that is to be applied upon the fulfillment of an associated triggering condition (e.g. like an Ax event associated with a measurement object).

The configuration of the triggering condition may also be provided as a part of a measurement configuration. This may be done by enhancing the reporting configuration to cover the case where the triggering of a measurement ID linked to

```
MeasConfig ::=                         SEQUENCE {
    ...
    }
OPTIONAL,   -- Need M
    quantityConfig                     QuantityConfig
OPTIONAL,   -- Need M
    measGapConfig                      MeasGapConfig
OPTIONAL,   -- Need M
    measGapSharingConfig               MeasGapSharingConfig
OPTIONAL,   -- Need M
    ...,
    measGpConfigToAddModList   MeasGapConfigToAddModList   OPTIONAL
}
MeasGapConfigToAddModList ::=   SEQUENCE (SIZE (1..maxNrofMeasGaps)) OF MeasGapConfigoAddMod
MeasGapConfigToAddMod ::=              SEQUENCE {
    measGapConfigId                    MeasGapConfigId,
    measGapConfig                      MeasGapConfig
}
MeasIdsAssociationToAddMod ::=         SEQUENCE {
    measId                             MeasId,
    dependentMeasId            SEQUENCE (SIZE (1..maxReportConfigId)) OF MeasId   OPTIONAL,
    initialState       ENUMERATED [enabled, disabled],
    reportMeasurements         BOOLEAN,
    triggerBindingOnDependents BOOLEAN,
    measGapConfigID            MeasGapConfigId,
    ...
}
(or using the modified MeasIdToMod-r16 IE)
MeasIdToAddMod-r16 ::=                 SEQUENCE {
    measId                             MeasId,
    measObjectId                       MeasObjectId,
    reportConfigId                     ReportConfigId,
    dependentMeasIds           SEQUENCE (SIZE (1..maxMeasId)) OF MeasId   OPTIONAL,
    initialState               ENUMERATED [enabled, disabled],
    reportMeasurements         BOOLEAN,
    triggerBindingOnDependents BOOLEAN,
    measGapConfigID            MeasGapConfigId,
}
``` such reporting configuration triggers the UE to apply the stored measConfig, which in turn may reconfigure the UE to add, remove or modify the UE's current measurement configuration.

The UE indicates to the network when it has applied a configuration, e.g., that becomes unlocked due to the fulfillment of a condition. The ACKnowledgment (ACK) may be triggered by the UE in response to applying a configuration. The ACK may be the RRCReconfigurationComplete message or part thereof. Alternatively, the UE suppresses the ACK, meaning that the UE does not transmit any ACK in response to applying the configuration. The ACK may allow the network to be aware of what exact configuration the UE is using, i.e. what has been applied and has been stored but not applied. This may be important for the network in case the network decides to perform further actions requiring knowledge of UE's current configuration, such as if the UE has applied a certain measurement gap configuration. As such, the network knows when and where in frequency exactly to schedule the UE or, even to unlock network functions that may depend on a certain protocol state.

There may be some scenarios where the network does not need to be perfectly aware of if the UE has applied a configuration or not. Whether the UE shall respond with an ACK or not may be indicated by the network. There can be two ways of indicating this:

A. Configured on a General Level and Apply to any Conditional Configurations:

In this case, the indication may be signaled on the same or higher up in the signaling structure of the conditional configurations. This has the benefit that only one indication is needed to be able to control whether or not the UE shall send the acknowledgements or not.

B. Configured Per Conditional Configuration

In this case, the indication may be signaled within, or on the same level of the signaling structure, as the conditional configuration. This has the benefit that the network can decide to have different behaviors for different configurations. For example, a configuration which changes the behavior of the UE in such a way that the network must be aware (e.g. some physical layer configuration impacting how/when the UE transmits certain signals may require the network to be aware of them in order for the network to correctly decodes the UEs signal) could be configured with acknowledgements. On the other hand, some configuration changes in the UE may not be critical for the network to know exactly when they are applied (e.g. that the UE "unlocks" certain RRC measurement configurations).

The acknowledgement may comprise an indication indicating which configuration the UE has applied. This is beneficial in case the UE has multiple conditional configurations, since the UE would not only indicate that it has applied a conditional configuration, but also indicated which one. The indication may be referred to as a configuration identifier. The configuration identifier may be provided to the UE with the conditional configurations.

Now, turning to FIG. 8, a flow chart illustrating a method 800, in a wireless device for performing measurements and reporting, will be described. The method can be implemented in a UE, or wireless device such as 1010 of FIGS. 10, 11 and 12. Method 800 comprises:

Step 810: storing a plurality of received measurement configurations, which are linked to each other;

Step 820: applying a first measurement configuration from the plurality of measurement of configurations;

Step 830: determining whether to apply a second measurement configuration from the plurality of measurement configurations based on the first measurement configuration.

In some examples, applying the first measurement configuration may comprise performing a measurement, monitoring fulfillment of a condition based on the measurement performed according to the first measurement configuration, reporting the measurement, or, performing the measurement and reporting the measurement.

In some examples, the second measurement configuration may in a locked/deactivated state initially and determining whether to apply a second measurement configuration may comprises: determining that a measurement performed according to the first measurement configuration fulfils a condition; applying the second measurement configuration.

In some examples, the method may further deactivate the second measurement configuration when the measurement from the first measurement configuration does not fulfil the condition anymore.

In some examples, applying the second measurement configuration may comprise performing a measurement, reporting a measurement or activating a third measurement configuration.

In some examples, a measurement configuration may comprise a measurement to be performed and a condition, the condition once fulfilled triggers activation of another measurement configuration.

In some examples, the plurality of measurement configurations can be linked to each other using an association between reporting configurations, an association between measurement configurations, or a conditional reconfiguration indication.

In some examples, a measurement configuration can correspond to a measId, which is associated with a reportConfig and a measObject. In some examples, the linked measurement configurations can be of the same type or different types. In some examples, two linked measurement configurations can be mutually exclusive.

In some examples, a measurement configuration can trigger a deactivation of another measurement configuration.

In some examples, when a condition triggering reporting of a second measurement is fulfilled, the method may check if a condition triggering reporting of a first measurement is fulfilled. In some examples, the plurality of measurement configurations may be further associated with measurement gaps. Also, the method may notify a network node that a measurement gap is activated.

In some examples, the method may send to a network node an acknowledgement indicating application of the first measurement configuration.

In some examples, the acknowledgement may comprise an indication of which measurement configuration is applied.

In some examples, the method may suppress sending of an acknowledgement to a network node, indicating application of the first measurement configuration.

In some examples, the plurality of measurements being linked together may comprise a chain of measurements that are dependent from each other.

Figure 9:
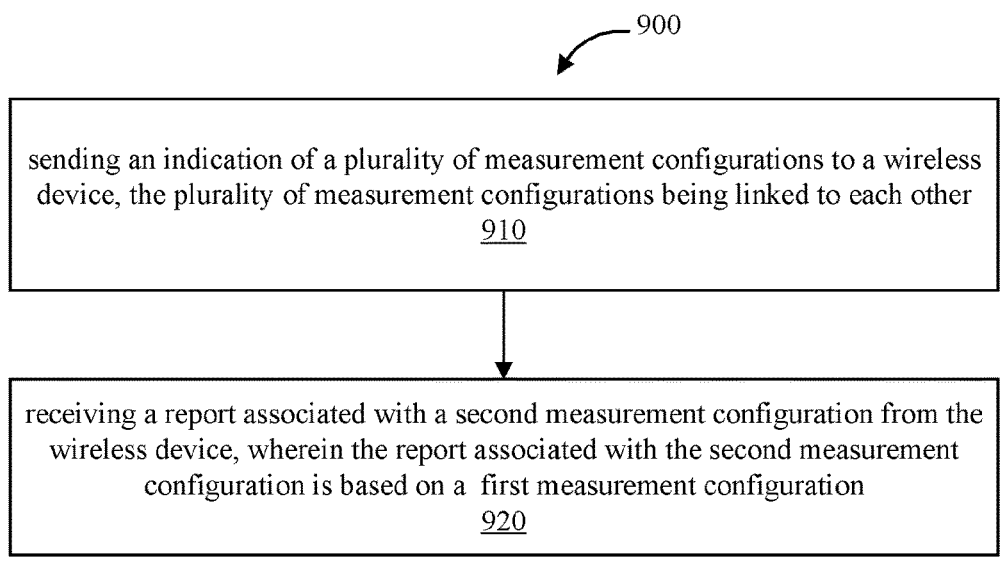
FIG. 9 is a flow chart of a method in a network node, according to an embodiment.

Now, turning to FIG. 9, a flow chart illustrating a method 900 in a network node for indicating measurements and reporting, will be described. The method can be implemented in a network node such as 1020 of FIGS. 10, 13 and 14.

Method 900 comprises:

Step 910: sending an indication of a plurality of measurement configurations to a wireless device, the plurality of measurement configurations being linked to each other;

Step 920: receiving a report associated with a second measurement configuration from the wireless device, wherein the report associated with the second measurement configuration is based on a first measurement configuration.

In some examples, the plurality of measurement configurations can be linked to each other using an association between reporting configurations, an association between measurement configurations, or a conditional reconfiguration indication.

In some examples, a measurement configuration corresponds to a measId, which is associated with a reportConfig and a measObject.

In some examples, the linked measurement configurations can be of the same type or different types.

In some examples, two linked measurement configurations can be mutually exclusive.

In some examples, a measurement configuration can trigger a deactivation of another measurement configuration.

In some examples, the plurality of measurement configurations can be further associated with measurement gaps.

In some examples, the method may further receive a notification from the wireless device indicating that a measurement gap is activated.

In some examples, the method may receive an acknowledgement from the wireless device, the acknowledgement comprising an indication of which measurement configuration is applied.

In some examples, the plurality of measurements being linked together may comprise a chain of measurements that are dependent from each other.

In some examples, receiving the report associated with the second measurement configuration can be based on whether the first measurement configuration has met a condition for triggering the second measurement configuration.

In some examples, the plurality of measurement configurations may comprise handover commands and/or measurement gaps.

Figure 10:
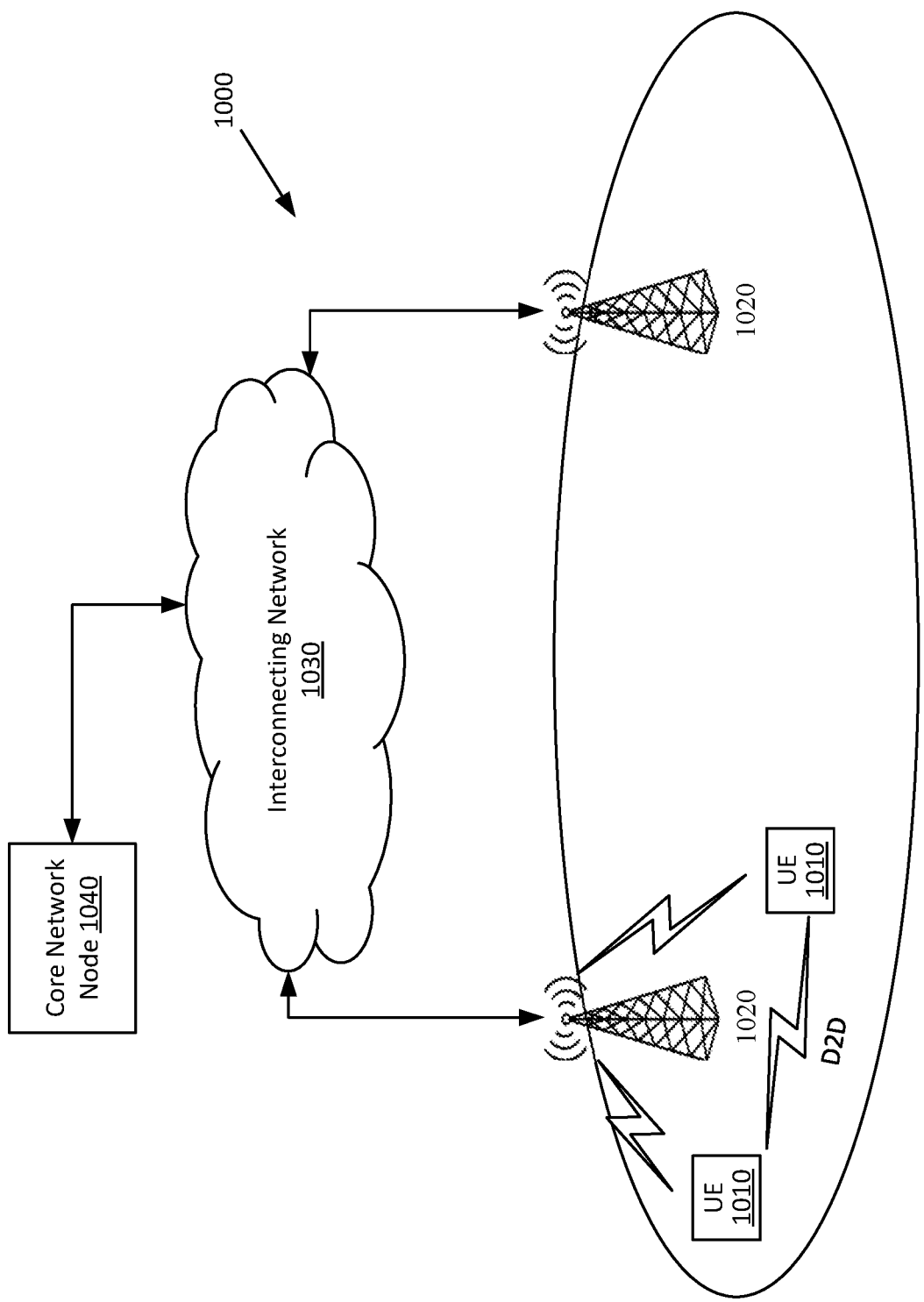
FIG. 10 illustrates one example of a wireless communications system in which embodiments of the present disclosure may be implemented.

FIG. 10 illustrates an example of a wireless network 1000 that may be used for wireless communications. Wireless network 1000 includes UEs 1010 and a plurality of radio network nodes 1020 (e.g., Node Bs (NBs) Radio Network Controllers (RNCs), evolved NBs (eNBs), next generation NB (gNBs), etc.) directly or indirectly connected to a core network 1030 which may comprise various core network nodes. The network 1000 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 1010 may be capable of communicating directly with radio network nodes 1020 over a wireless interface. In certain embodiments, UEs may also be capable of communicating with each other via device-to-device (D2D) communication. In certain embodiments, network nodes 1020 may also be capable of communicating with each other, e.g. via an interface (e.g. X2 in LTE or other suitable interface).

As an example, UE 1010 may communicate with radio network node 1020 over a wireless interface. That is, UE 1010 may transmit wireless signals to and/or receive wireless signals from radio network node 1020. The wireless signals may contain voice traffic, data traffic, control signals, and/or any other suitable information. In some embodiments, an area of wireless signal coverage associated with a radio network node 1020 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 1010 are described in more detail below with respect to FIGS. 11 and 12.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 1020 may interface with a radio network controller (not shown). The radio network controller may control network nodes 1020 and may provide certain radio resource management functions, mobility management functions, and/or other suitable functions. In certain embodiments, the functions of the radio network controller may be included in the network node 1020. The radio network controller may interface with the core network node 1040. In certain embodiments, the radio network controller may interface with the core network node 1040 via the interconnecting network 1030.

The interconnecting network 1030 may refer to any interconnecting system capable of transmitting audio, video, signals, data, messages, or any combination of the preceding. The interconnecting network 1030 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 1040 may manage the establishment of communication sessions and various other functionalities for wireless devices 1010. Examples of core network node 1040 may include MSC, MME, SGW, PGW, O&M, OSS, SON, positioning node etc. Wireless devices 110 may exchange certain signals with the core network node 1040 using the non-access stratum layer. In non-access stratum signaling, signals between wireless devices 1010 and the core network node 1040 may be transparently passed through the radio access network. In certain embodiments, network nodes 1020 may interface with one or more other network nodes over an internode interface. For example, network nodes 1020 may interface each other over an X2 interface.

Although FIG. 10 illustrates a particular arrangement of network 1000, the disclosure contemplates that the various embodiments described herein may be applied to a variety of networks having any suitable configuration. For example, network 1000 may include any suitable number of wireless devices 1010 and network nodes 1020, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any R AT, such asNB-IoT, WiFi, Bluetooth, next generation RAT (NR, NX), etc.

The communication system 1000 may itself be connected to a host computer (not shown), which may be embodied in the hardware and/or software of a standalone server, a cloud-implemented server, a distributed server or as processing resources in a server farm. The host computer may be under the ownership or control of a service provider, or may be operated by the service provider or on behalf of the service provider. The connections between the communication system 1000 and the host computer may extend directly from the core network 1040 to the host computer or may extend via the intermediate network 1030.

The communication system of FIG. 10 as a whole enables connectivity between one of the connected wireless devices (WDs) 1010 and the host computer. The connectivity may be described as an over-the-top (OTT) connection. The host computer and the connected WDs 1010 are configured to communicate data and/or signaling via the OTT connection, using an access network, the core network 1040, any intermediate network 1030 and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 1010 connecting via an OTT connection terminating at the WD 1010 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 1020 and or the wireless device 1010.

One or more of the various embodiments in this disclosure improve the performance of OTT services provided to the WD 1010 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

Figure 11:
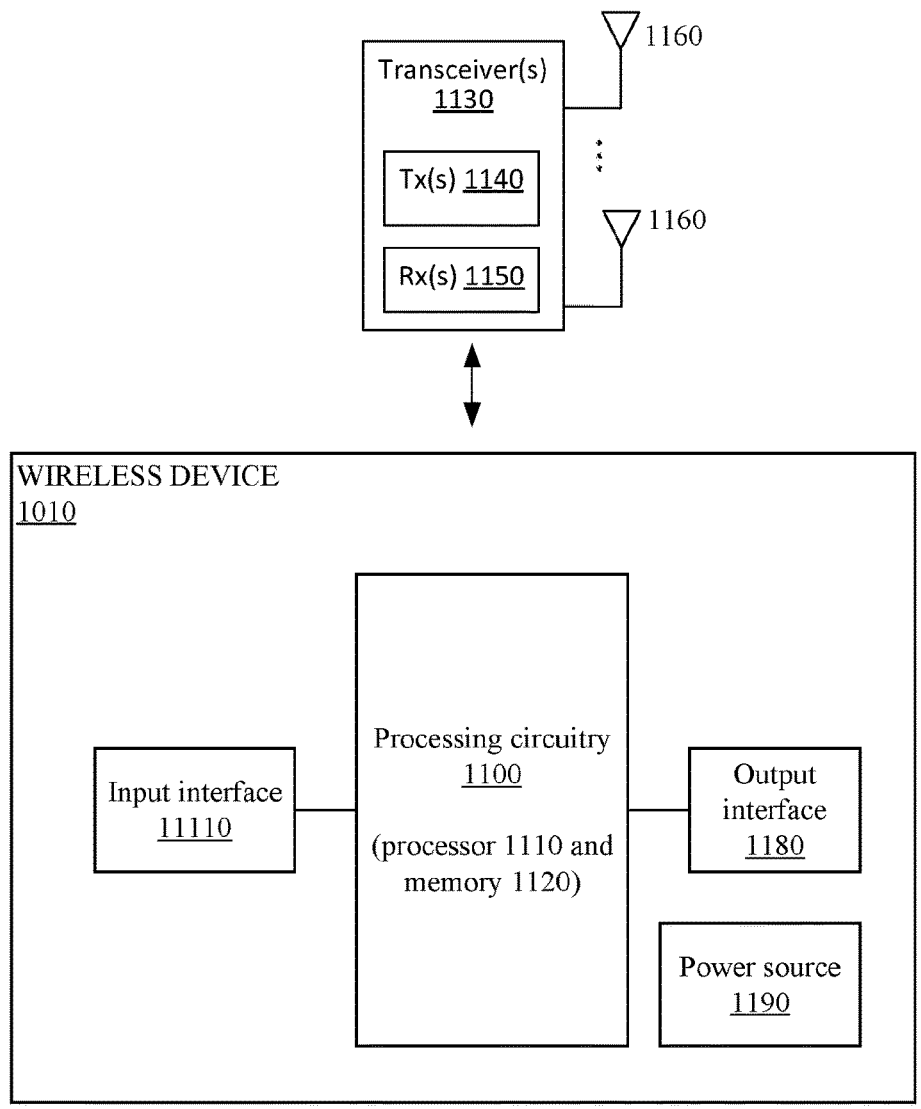
FIGS. 11 and 12 are block diagrams that illustrate a wireless device according to an embodiment.

FIG. 11 is a schematic block diagram of the wireless device 1010 according to some embodiments. As illustrated, the wireless device 1010 includes circuitry 1100 comprising one or more processors 1110, e.g., Central Processing Units (CPUs), Application Specific Integrated Circuits (ASICs), Field Programmable Gate Arrays (FPGAs), and/or the like) and memory 1120. The wireless device 1010 also includes one or more transceivers 1130 that each include one or more transmitters 1140 and one or more receivers 1150 coupled to one or more antennas 1160. The wireless device 1010 may also comprise a network interface and more specifically an input interface 1170 and an output interface 1180 for communicating with other nodes. The wireless device may also comprise a power source 1190.

In some embodiments, the functionality of the wireless device 1010 described above may be fully or partially implemented in software that is, e.g., stored in the memory 1120 and executed by the processor(s) 1100.

Figure 8:
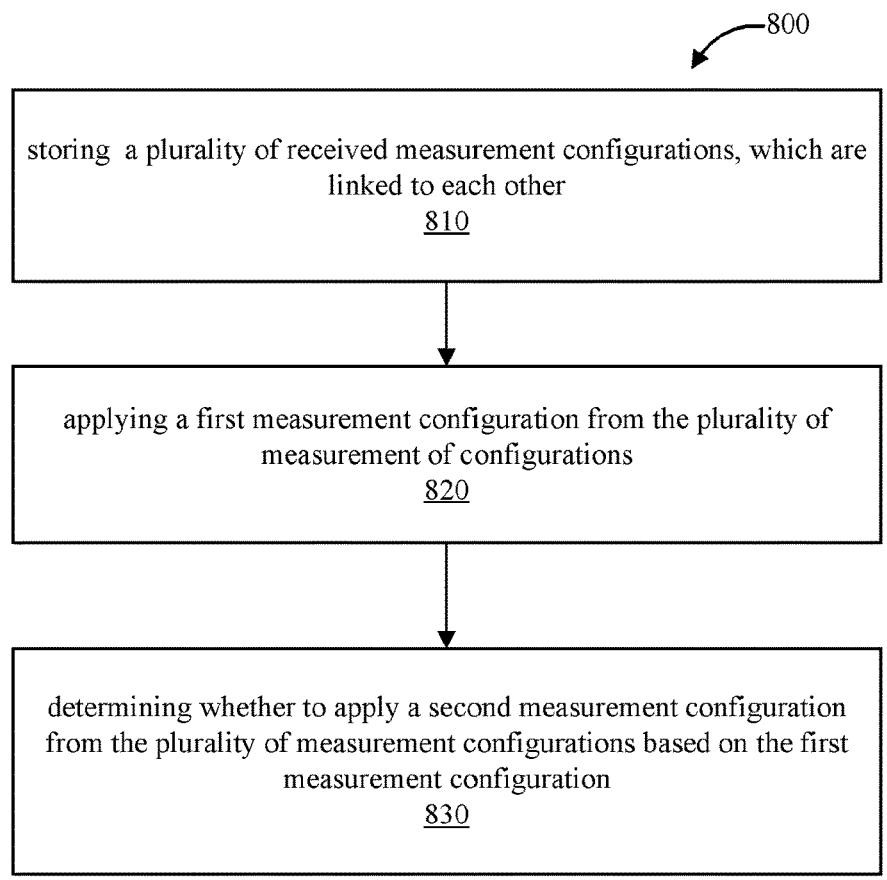
FIG. 8 is a flow chart of a method in a wireless device, according to an embodiment.

In some embodiments, a computer program including instructions which, when executed by the at least one processor 1110, causes the at least one processor 1110 to carry out the functionality of the wireless device 1010 according to any of the embodiments described herein is provided (e.g. method 800 of FIG. 8). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 12:
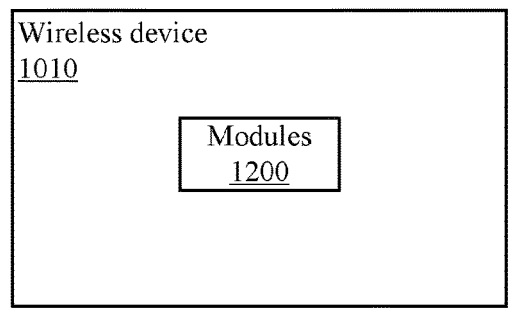

FIG. 12 is a schematic block diagram of the wireless device 1010 according to some other embodiments of the present disclosure. The wireless device 1010 includes one or more modules 1200, each of which is implemented in software. The module(s) 1200 provide the functionality of the wireless device 1010 described herein. The module(s) 1200 may comprise, for example, a receiving module, an application module and a determining module operable to perform step 810, step 820 and step 830 of FIG. 8, respectively.

Figure 13:
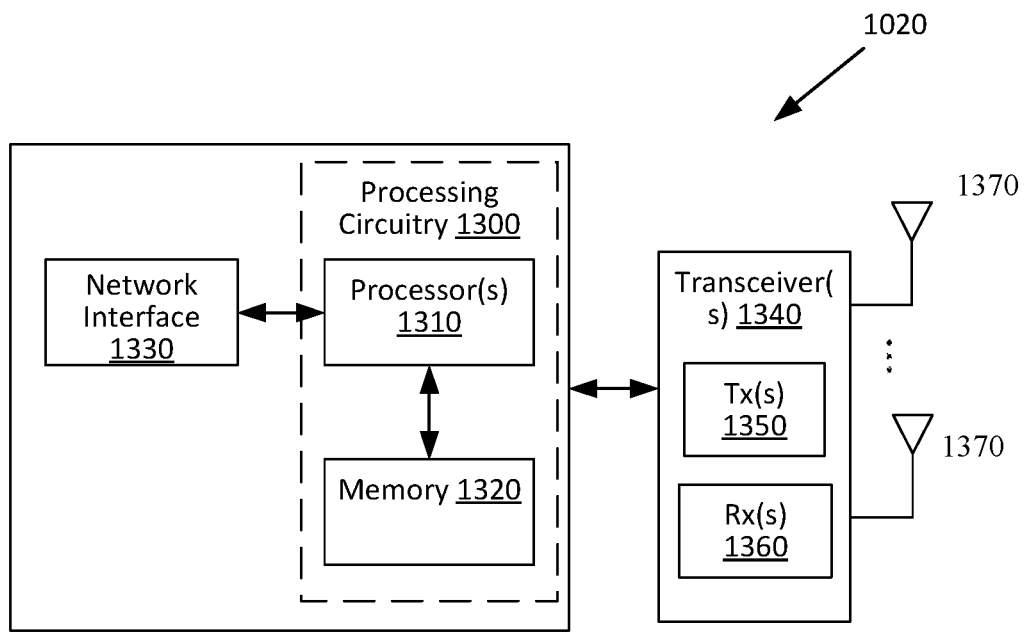
FIGS. 13 and 14 are block diagrams that illustrate a network node according to an embodiment.

FIG. 13 is a schematic block diagram of a network node 1020 according to some embodiments. As illustrated, the network node 1020 includes a processing circuitry 1300 comprising one or more processors 1310 (e.g., CPUs, ASICs, FPGAs, and/or the like) and memory 1320. The network node also comprises a network interface 1330. The network node 1020 also includes one or more transceivers 1340 that each include one or more transmitters 1350 and one or more receivers 1360 coupled to one or more antennas 1370. In some embodiments, the functionality of the network node 1010 described above may be fully or partially implemented in software that is, e.g., stored in the memory 1320 and executed by the processor(s) 1310, which can be configured to perform method 900 of FIG. 9.

Figure 14:
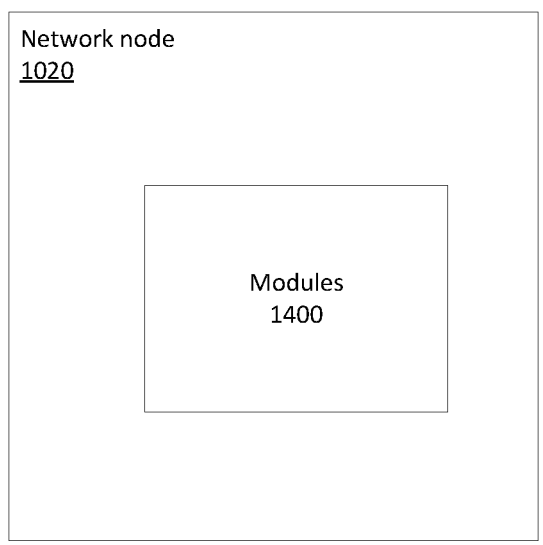

FIG. 14 is a schematic block diagram of the network node 1020 according to some other embodiments. The network node 1020 includes one or more modules 1400, each of which is implemented in software. The module(s) 1400 provide the functionality of the network node 1020 described herein. The module(s) 1400 may comprise, for example, a sending module and a receiving module operable to perform step 710 and 720 of FIG. 7, respectively.

Figure 15:
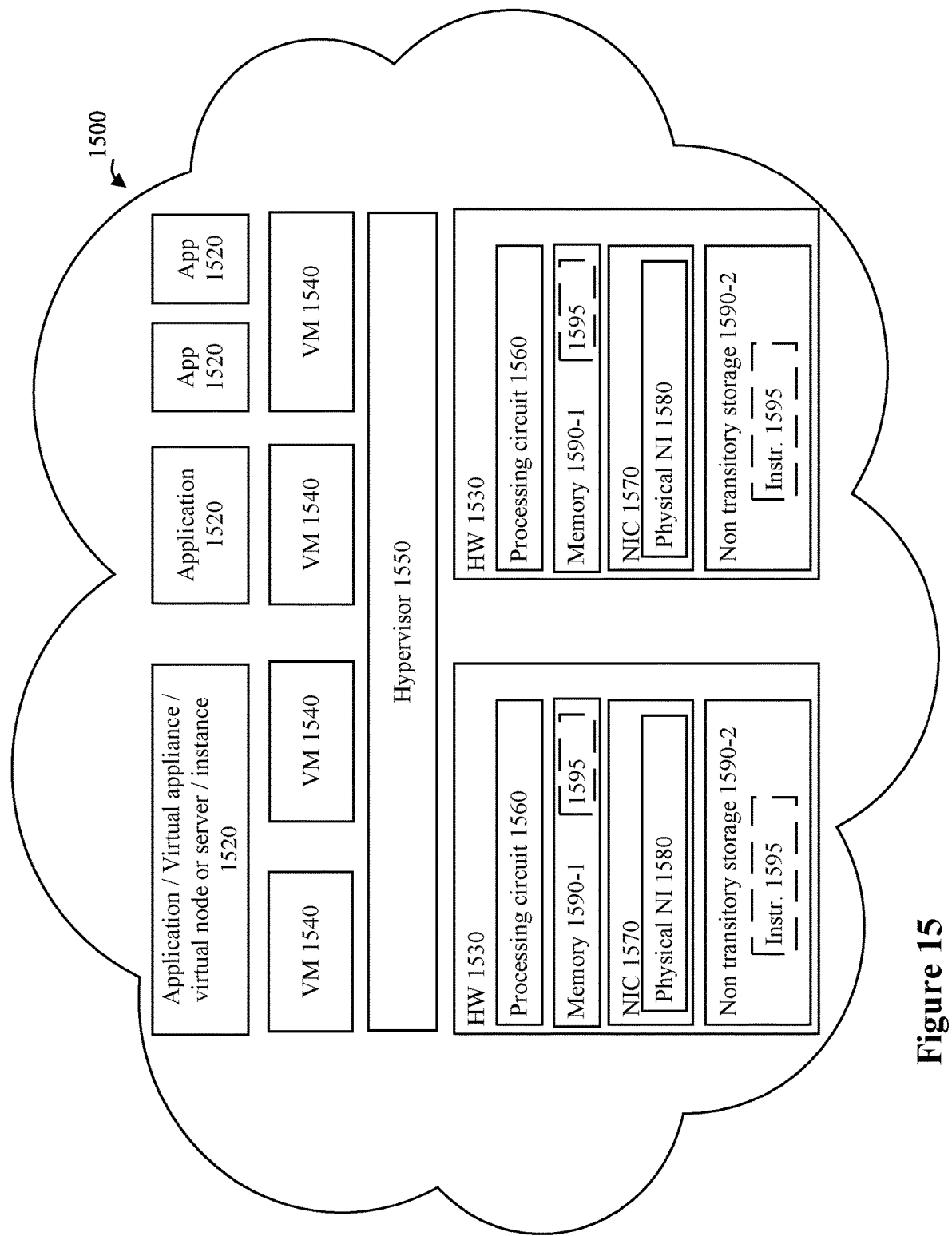
FIG. 15 illustrates a virtualized environment of a network node, according to an embodiment.

FIG. 15 is a schematic block diagram that illustrates a virtualized embodiment of the wireless device 1010 or network node 1020, according to some embodiments. As used herein, a "virtualized" node 1500 is a network node 1020 or wireless device 1010 in which at least a portion of the functionality of the network node 1020 or wireless device 1010 is implemented as a virtual component (e.g., via a virtual machine(s) executing on a physical processing node(s) in a network(s)). For example, in FIG. 15, there is provided an instance or a virtual appliance 1520 implementing the methods or parts of the methods of some embodiments. The one or more instance(s) runs in a cloud computing environment 1500. The cloud computing environment provides processing circuits 1530 and memory 1590-1 for the one or more instance(s) or virtual applications 1520. The memory 1590-1 contains instructions 1595 executable by the processing circuit 1560 whereby the instance 1520 is operative to execute the methods or part of the methods described herein in relation to some embodiments.

The cloud computing environment 1500 comprises one or more general-purpose network devices including hardware 1530 comprising a set of one or more processor(s) or processing circuits 1560, which may be commercial off-the-shelf (COTS) processors, dedicated ASICs, or any other type of processing circuit including digital or analog hardware components or special purpose processors, and network interface controller(s) (NICs) 1570, also known as network interface cards, which include physical Network Interface 1580. The general-purpose network device also includes non-transitory machine readable storage media 1590-2 having stored therein software and/or instructions 1595 executable by the processor 1560. During operation, the processor(s)/processing circuits 1560 execute the software/instructions 1595 to instantiate a hypervisor 1550, sometimes referred to as a virtual machine monitor (VMM), and one or more virtual machines 1540 that are run by the hypervisor 1550.

A virtual machine 1540 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1540, and that part of the hardware 1530 that executes that virtual machine 1540, be it hardware 1530 dedicated to that virtual machine 1540 and/or time slices of hardware 1530 temporally shared by that virtual machine 1540 with others of the virtual machine(s) 1540, forms a separate virtual network element(s) (VNE).

The hypervisor 1550 may present a virtual operating platform that appears like networking hardware to virtual machine 1540, and the virtual machine 1540 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1520 may be implemented on one or more of the virtual machine(s) 1540, and the implementations may be made differently.

In some embodiments, a carrier comprising a computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium such as a magnetic, optical, or electrical storage, CD-ROM), DVD-ROM, memory device (volatile or non-volatile), etc. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method in a wireless device for performing measurements and reporting, the method comprising:
   storing a plurality of received measurement configurations, which are linked to each other;
   applying a first measurement configuration from the plurality of measurement of configurations; and
   determining whether to apply a second measurement configuration from the plurality of measurement configurations based on the first applied measurement configuration, wherein determining whether to apply a second measurement configuration comprises:
   determining that a measurement performed according to the first measurement configuration fulfil a condition;
   applying the second measurement configuration, and
   deactivating the second measurement configuration when the measurement performed according to the first measurement configuration does not fulfil the condition anymore.

2. The method of claim 1, wherein applying the first measurement configuration comprises one of performing a measurement, monitoring fulfillment of a condition based on the measurement performed according to the first measurement configuration, reporting the measurement, or performing the measurement and reporting the measurement.

3. The method of claim 1, wherein applying the second measurement configuration comprises one of performing a measurement, reporting a measurement, or activating a third measurement configuration.

4. The method of claim 1, wherein a measurement configuration comprises a measurement to be performed and a condition, the condition once fulfilled triggers activating of another measurement configuration.

5. The method of claim 1, wherein the plurality of measurement configurations is linked to each other using one of an association between reporting configurations, an association between measurement configurations, and a conditional reconfiguration indication, and
   wherein the linked measurement configurations are one of same type and different types.

6. The method of claim 5, wherein a measurement configuration corresponds to a measId, which is associated with a reportConfig and a measObject.

7. The method of claim 1, wherein two linked measurement configurations are mutually exclusive, and
   wherein a measurement configuration can trigger a deactivation of another measurement configuration.

8. The method of claim 1, further comprising, when a condition triggering reporting of a second measurement is fulfilled, checking if a condition for triggering reporting of a first measurement is fulfilled.

9. The method of claim 1, wherein the plurality of measurement configurations is further associated with measurement gaps.

10. The method of claim 9, further comprising notifying a network node that a measurement gap is activated.

11. The method of claim 1, further comprising sending to a network node an acknowledgement indicating application of the first measurement configuration, wherein the acknowledgement comprises an indication of which measurement configuration is applied.

12. The method of claim 1, further comprising suppressing sending an acknowledgement to a network node, for applying the first measurement configuration.

13. The method of claim 1, wherein the plurality of measurements being linked together comprises a chain of measurements that are dependent from each other.

14. A computer program product comprising a non-transitory computer readable storage medium having computer readable program code embodied in the medium, the computer readable program code comprising computer readable program code to operate according to the method of claim 1.

15. A wireless device comprising a communication interface and processing circuitry connected thereto, the processing circuitry configured to:

store a plurality of received measurement configurations, which are linked to each other;

apply a first measurement configuration from the plurality of measurement of configurations; and determine whether to apply a second measurement configuration from the plurality of measurement configurations based on the first applied measurement configuration, wherein determining whether to apply a second measurement configuration comprises:

determine that a measurement performed according to the first measurement configuration fulfil a condition;

apply the second measurement configuration, and deactivate the second measurement configuration when the measurement performed according to the first measurement configuration does not fulfil the condition anymore.

* * * * *